United States Patent
Adams et al.

(10) Patent No.: US 6,255,366 B1
(45) Date of Patent: Jul. 3, 2001

(54) SULFOPOLYMERS AS EMULSION STABILIZERS WITH IMPROVED COAGULUM LEVEL

(75) Inventors: Linda Jane Adams; Mark Dwight Clark, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/410,917

(22) Filed: Oct. 1, 1999

(51) Int. Cl.$^7$ .................................................... C08L 67/00
(52) U.S. Cl. ........................................................... 523/501
(58) Field of Search ...................... 523/500, 501

(56) References Cited

U.S. PATENT DOCUMENTS

| | | |
|---|---|---|
| 3,734,874 | 5/1973 | Kibler et al. . |
| 3,779,993 | 12/1973 | Kibler et al. . |
| 4,167,395 | 9/1979 | Englehardt et al. . |
| 4,335,220 | 6/1982 | Coney . |
| 4,880,700 | 11/1989 | Charmot et al. . |
| 4,908,155 * | 3/1990 | Leemans ............... 252/353 |
| 4,925,588 | 5/1990 | Berrod et al. . |
| 4,939,233 | 7/1990 | Jenkins et al. . |
| 4,946,932 | 8/1990 | Jenkins . |
| 5,156,651 | 10/1992 | Girardeau et al. . |
| 5,266,322 | 11/1993 | Myers et al. . |
| 5,268,412 | 12/1993 | Raynolds . |
| 5,277,978 | 1/1994 | Feustel et al. . |
| 5,324,752 * | 6/1994 | Barretto ............... 521/28 |
| 5,342,877 | 8/1994 | Clark . |
| 5,344,872 | 9/1994 | Debord et al. . |
| 5,349,026 | 9/1994 | Emmons et al. . |
| 5,371,148 | 12/1994 | Taylor et al. . |
| 5,380,520 | 1/1995 | Dobbs . |
| 5,492,959 | 2/1996 | Clark . |
| 5,543,488 | 8/1996 | Miller et al. . |
| 5,780,151 | 7/1998 | Miller et al. . |

FOREIGN PATENT DOCUMENTS

| | | |
|---|---|---|
| 0 299 134 | 1/1989 | (EP) . |
| 0 333 547 | 9/1989 | (EP) . |
| 0 532 961 | 3/1993 | (EP) . |
| WO 97/28199 | 8/1997 | (WO) . |

OTHER PUBLICATIONS

McCartney et.al, "Preparation of a Water Soluble Polyester Surfactant and Its Use In the Emulsion Polymerization of Styrene", Polymer Bulletin, vol. 23, 367–371 (1990).

Chen, et.al, "Preparation and Surface Activity of Water–Soluble Polyesters" J. Appl. Polymer Science., vol. 34, 1879–1888 (1987).

* cited by examiner

Primary Examiner—Paul R. Michl
(74) Attorney, Agent, or Firm—Rose M. Allen, Esq.; Bernard Graves, Jr., Esq.

(57) ABSTRACT

The invention provides a process for preparing a water dispersed polymer blend, comprising the steps of:

(I) mixing
  (a) water;
  (b) at least one ethylenically unsaturated monomer;
  (c) at least one branched water-dispersible sulfopolymer; and
(II) polymerizing the ethylenically unsaturated monomer within the mixture to provide the water dispersed polymer blend.

48 Claims, No Drawings

SULFOPOLYMERS AS EMULSION STABILIZERS WITH IMPROVED COAGULUM LEVEL

FIELD OF THE INVENTION

The present invention relates to processes for preparing water-dispersed blends of organic polymers, and latexes, by emulsion polymerization of ethylenically unsaturated monomers in the presence of sulfo-polymer stabilizers, products therefrom, and their use in water resistant coatings.

BACKGROUND OF THE INVENTION

Latexes are suspensions or emulsions of organic polymer particles in an aqueous medium. One challenge in the preparation of any synthetic latex is the production of a stable latex with minimal amounts of coagulum (polymer recovered in any form other than that of a stable latex). As noted in *Emulsion Polymers and Emulsion Polymerization,* "The Formation of Coagulum in Emulsion Polymerization," by J. W. Vanderhoff, 1981, American Chemical Society, coagulum is produced in all sizes of reactors and poses several problems. Such problems include loss of yield of the desired latex, processing difficulties due to the necessity of clean-up, more batch-to-batch variation in latex properties, and health, safety, and environmental problems insofar as the coagulum must be disposed of. Disposal is even more problematic due to entrapment within the coagulum of toxic monomers such as vinyl chloride and acrylonitrile. According to this reference, the formation of coagulum is due to either (1) a failure of the colloidal stability of the latex during or after polymerization, which leads to flocculation of the suspended polymer particles, or (2) polymerization of the monomer(s) by mechanisms other than by the intended emulsion polymerization.

In general, smaller polymer particles tend to result in more stable emulsions, and therefore, tend to form less coagulum. Aqueous polymerization of ethylenically unsaturated monomers in the absence of emulsifiers or surfactants leads to relatively large polymer particles, while the use of emulsifiers or surfactants leads to polymerization in small micelles, which produce relatively small polymer particles. Small particle sizes (those less than 100 nm) have typically been achieved by using relatively high levels of small molecule anionic surfactants such as AEROSOL-OT™ (sodium dioctyl sulfosuccinate) and AEROSOL NPES™2030, (ammonium nonylphenoxy polyethoxy ethanol sulfate) which are both sold by Cytec Industries, Inc., West Paterson, N.J., U.S.A.

The particle size of a latex can also have a direct impact on the performance of a film or coating prepared from that latex. Among those properties that can be affected are gloss, clarity, film formation, and substrate penetration (for porous substrates). Overall, a smaller polymer particle size will have a positive effect on such properties. However, small particle size and the properties directly affected by it are not the only important properties in water-based coatings. Water-resistance/sensitivity of the final coating is also very important. A high level of anionic surfactant, the very component which promotes small particle size in the latex, and all of its concomitant advantages, is also likely to be detrimental to the water-resistance of the final coating.

Prior inventors have explored a modified approach, in which the same types of anionic groups utilized in the small molecule surfactants are bonded to polymers, which are used as stabilizers for emulsion polymerization.

U.S. Pat. Nos. 3,734,874, 3,779,993, and 4,335,220 describe the preparation of water-soluble or dispersible polyesters having anionic sulfonate groups, with no branching of the polymer chains.

U.S. Pat. No. 4,946,932 describes methods for preparing water dispersed polyester/acrylic copolymer blends via emulsion polymerization in the presence of sulfonated but unbranched polyesters as stabilizers. Similarly, U.S. Pat. Nos. 4,939,233 and 5,342,877, and WO 95/01399 describe methods for preparing water-dispersed copolymer blends via emulsion polymerization of various ethylenically unsaturated monomers using sulfonated but unbranched polyesters for the polymerization.

WO 97/28199 describes small particle size latex polymer blends comprising co-polymers of vinyl/acrylic monomers and linear chain water-dispersible sulfonate group-containing polyesters having highly specific sulfonate group contents (between 7–8 wt % of sulfonate groups in the sulfopolymer), which have low coagulum levels in the final latex.

Nevertheless, none of the references above teach or suggest the use of branched sulfopolymer stabilizers for the emulsion polymerization of ethylenically unsaturated monomers.

U.S. Pat. No. 5,277,978 describes methods for preparing water dispersible polyester/acrylic copolymer blends having coagulum contents as little as approximately 1%, via emulsion polymerization of ethylenically unsaturated monomers in the presence of sulfonated polyester stabilizers.

U.S. Pat. Nos. 5,543,488 and 5,780,151 describe the preparation of branched sulfopolyesters, and sulfopolyamides for use as adhesives, but do not teach or suggest the use of the branched sulfopolymers as stabilizers in emulsion polymerizations.

Of the above references, only U.S. Pat. No. 5,277,978 and WO 97/28199 describe achievement of coagulum levels less than approximately 1–2 wt % at sulfopolymer levels below 10 wt %. Only WO 97/28199 describes coagulum levels of less than 0.5 wt % at sulfopolymer levels below about 10 wt %.

Therefore, there is a continuing need for improved emulsion polymerization processes that provide small particle-size latexes that produce very little coagulum, while minimizing the amount of anionic emulsion stabilizers that are detrimental to the water resistance of coatings made from the latexes.

SUMMARY OF THE INVENTION

The present invention solves the above-described problems and needs in the art by providing processes for preparing water-dispersed blends of organic polymers and latexes, products therefrom, and uses thereof.

In one embodiment, the invention provides a process for preparing a water dispersed polymer blend, comprising the steps of:
 (I) mixing
  (a) water;
  (b) at least one ethylenically unsaturated monomer;
  (c) at least one branched water-dispersible sulfopolymer; and
 (II) polymerizing the ethylenically unsaturated monomer within the mixture to provide the water dispersed polymer blend.

In another embodiment, the invention provides a process for preparing a water dispersed polymer blend, comprising:
 (a) dispersing a branched water dispersible sulfopolyester in water, to form an aqueous sulfopolyester dispersion containing from about 0.1% to about 35% sulfopolyester solids by weight; and (b) incrementally adding at least one ethylenically unsaturated monomer, during a polymerization time period sufficient to substantially complete polymerization of the ethylenically unsaturated monomers; wherein (i) the ethylenically unsaturated monomers comprise an acrylic or methacrylic monomer, styrene, vinyl acetate, or a mixture thereof;

(ii) the branched water dispersible sulfopolymer comprises about 1.5 to 8 weight % of the dry weight of the polymer blend, and the polymerized ethylenically unsaturated monomers comprise about 98.5 to 92 weight % of the dry weight of the polymer blend; and (iii) the water dispersed polymer blend contains less than about 0.5 weight % coagulum; based on the combined dry weights of the polymers.

In other embodiments, the invention also provides water-dispersed polymer blends, prepared by the processes of the invention.

In other embodiments, the invention provides a composition for preparing a water-resistant coating comprising:

(a) a water-dispersed polymer blend prepared by the processes of the invention; and (b) one or more additives comprising a leveling agent, a rheology agent, a flow control agent, a plasticizer, a flatting agent, a pigment wetting and dispersing agent, a surfactant, an ultraviolet light absorber, an ultraviolet light stabilizer, a tinting pigment, an extender, a defoaming agent, an anti-foaming agent, an anti-settling agent, an anti-sag agent, a bodying agent, an anti-skinning agent, an anti-flooding agent, an anti-foaming agent, a fungicide, a mildewcide, a corrosion inhibitor, a thickening agent, a water-miscible organic solvent, or a coalescing agent.

In yet another embodiment, the invention provides a water-resistant coated article, prepared by applying the coating compositions of the invention to an article, and drying the coating composition.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included. It is to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a pharmaceutical carrier" includes mixtures of two or more such carriers, and the like.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent about, it will be understood that the particular value forms another embodiment. It will be further understood that the endpoints of each of the ranges are significant both in relation to the other endpoint, and independently of the other endpoint.

References in the specification and concluding claims to parts by weight of a particular element or component in a composition or article denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 12 carbon atoms. The term "lower alkyl" intends an alkyl group of from one to six carbon atoms, preferably from one to four carbon atoms. The term "cycloalkyl" intends a cyclic alkyl group of from three to eight, preferably five or six carbon atoms.

The term "alkylene" as used herein refers to a difunctional saturated branched or unbranched hydrocarbon chain containing from 1 to 24 carbon atoms, and includes, for example, methylene (—$CH_2$—), ethylene (—$CH_2$—$CH_2$—), propylene (—$CH_2$—$CH_2$—$CH_2$—), 2-methylpropylene [—$CH_2$—$CH(CH_3)$—$CH_2$—], hexylene [—$(CH_2)_6$—] and the like. "Lower alkylene" refers to an alkylene group of from 1 to 6, more preferably from 1 to 4, carbon atoms. The term "cycloalkylene" as used herein refers to a cyclic alkylene group, typically a 5- or 6-membered ring.

The term "aliphatic" as used herein describes branched or unbranched hydrocarbon chains or groups containing 1 to 24 carbon atoms which are saturated, i.e., they have no double bonds between the carbon atoms.

The term "alicyclic" as used herein refers to an aliphatic organic compound having a ring structure containing 3–10 ring carbons, wherein the ring contains no double bonds to one of the ring carbons.

The term "aromatic" as used herein describes substituted or unsubstituted benzene-like compounds of six to twenty four carbon atoms having at least one 6-membered ring of carbon atoms with alternating (conjugated) carbon-carbon double bonds.

The term "modified" is often used herein to describe polymers, and means that a particular monomeric unit that would typically make up the pure polymer has been replaced by another monomeric unit that shares a common polymerization capacity with the replaced monomeric unit. Thus, for example, it is possible to substitute diol residues for glycol in poly(ethylene glycol), in which case the poly(ethylene glycol) will be "modified" with the diol. If the poly(ethylene glycol) is modified with a mole percentage of the diol, then such a mole percentage is based upon the total number of moles of glycol that would be present in the pure polymer but for the modification. Thus, in a poly(ethylene glycol) that has been modified by 50 mole % with a diol, the diol and glycol residues are present in equimolar amounts.

The term "polyester" includes copolyesters.

The term "polymer" includes copolymers.

In one embodiment, the invention provides a process for preparing a water dispersed polymer blend, comprising the steps of:

(I) mixing
  (a) water;
  (b) at least one ethylenically unsaturated monomer;
  (c) at least one branched water-dispersible sulfopolymer; and
(II) polymerizing the ethylenically unsaturated monomer within the mixture to provide the water dispersed polymer blend.

The water dispersed polymer blends produced by these processes are latexes, and the process for producing the latexes in the presence of a sulfopolymer may be referred to as an emulsion polymerization process. The polymer blends (either in water-dispersed form, or in solid form after drying) are preferably mixtures of the previously prepared branched sulfopolymer emulsion stabilizer, and at least some polymer obtained by the aqueous free-radical emulsion polymerization of the ethylenically unsaturated monomers.

In the process described above, it is not required that the steps of mixing and polymerizing are carried out sequentially or any other particular order. For example, some polymerization of the ethylenically unsaturated monomer or monomers may occur prior to mixing with the water and/or branched water-dispersible sulfopolymer. Nevertheless, the process does require that at least some polymerization of the ethylenically unsaturated monomer occur after the ethylenically unsaturated monomer is mixed with the sulfopolymer and water, so that at least some of the ethylenically unsaturated monomer polymerizes in the presence of the sulfopolymer. Preferably, substantial amounts of the polymerization of ethylenically unsaturated monomer occur after mixing of the ethylenically unsaturated monomers with the sulfopolymer. More preferably, most or substantially all of the polymerization of ethylenically unsaturated monomer occurs after mixing of the ethylenically unsaturated monomers with the water and sulfopolymer.

Also it is not required that the steps of mixing water, ethylenically unsaturated monomer, and sulfopolymer occur in any particular order; in fact they may be mixed in any order. Nevertheless, in preferable embodiments, the water and sulfopolymer are initially mixed, then ethylenically unsaturated monomers are subsequently mixed with the aqueous sulfopolymer mixture. More preferably, the water and sulfopolymer are initially mixed, then the ethylenically unsaturated monomer is incrementally mixed with the water/sulfopolymer mixture over a period of time. Even more preferably, the incremental mixing of ethylenically unsaturated monomer with the water/sulfopolymer mixture occurs concurrently with polymerization of the ethylenically unsaturated monomers, as discussed below.

The above-described process of preparing water-dispersed polymer blends occurs in the presence of water, and the latexes produced by the process contain substantial quantities of water, so as to provide a substantially aqueous dispersion. Nevertheless, small quantities of organic co-solvents may optionally be present during the mixing and/or polymerization steps. The organic co-solvents which may be mixed with the water are preferably polar organic compounds with boiling points comparable to or lower than that of water, so as to allow evaporation of the water/co-solvent mixture when the latexes are applied to articles to form coatings, as described below. Suitable organic co-solvents for the polymerization process include alkanols (such as methanol, ethanol, propanol, isopropanol, n-butanol, isobutanol, t-butanol, ethylene glycol, propylene glycol, etc.) and ketones (such as acetone, methyl-ethyl ketone, cyclohexanone, etc.), acetonitrile, dimethylformamide, dimethylsulfoxide, and the like.

Ethylenically Unsaturated Monomers

The ethylenically unsaturated monomers that may be utilized in the processes of the invention are broadly defined for the purposes of this invention as any C2–C24 organic compound having a carbon-carbon double bond capable of undergoing free radical polymerization with itself or another ethylenically unsaturated monomer in aqueous media.

Classes and/or species of ethylenically unsaturated monomers that can be polymerized via the above method preferably include but are not limited to:

(a) an acrylic or methacrylic monomer;
(b) an alkenyl aromatic compound;
(c) a vinyl ester;
(d) an unsaturated dicarboxylic acid or the anhydride or lower alkyl diester thereof;
(e) a multifunctional acrylate or methacylate monomer;
(e) acrylonitrile or acrylamide;
(f) vinyl chloride;
(g) an acetoacetoxy functional monomer.

The class of acrylic or methacrylic monomers are defined for the purposes of this invention as monoesters which can be obtained by the reaction of acrylic acid or methacrylic acid with a $C_1$–$C_{24}$ alcohol having an alkyl, alkylene, or aryl group. Species within the group of acrylic or methacrylic monomers preferably include acrylic acid, methyl acrylate, ethyl acrylate, isopropyl acrylate, butyl acrylate, ethylhexyl acrylate, methacrylic acid, methyl methacrylate, ethyl methacrylate, isopropyl methacrylate, butyl methacrylate, ethylhexyl methacrylate, hydroxyethyl acrylate, hydroxyethyl methacrylate, and the like.

The class of alkenyl aromatic compounds are defined as $C_8$–$C_{24}$ compounds, having at least one aromatic ring singly bonded to one of the carbon atoms of a substituted or unsubstituted carbon-carbon double bond. Species within the class of alkenyl aromatic compounds preferably include styrene, α-methyl styrene, 4-acetoxystyrene, 4-hydroxystyrene, vinyl napthalene, cis and trans stilbene, cinnamic acid, and the like.

The class of vinyl esters preferably have the structure:

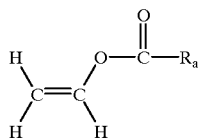

wherein $R_a$ is $C_1$–$C_{24}$ aliphatic, alicyclic, alkylene, or aromatic group. Species within the class of vinyl esters preferably include vinyl acetate and vinyl propionate, and the like.

Species within the class of unsaturated dicarboxylic acids, anhydrides or diesters thereof preferably include maleic acid, maleic acid esters, fumaric acid, fumaric acid esters, maleic anhydride, and the like.

Multifunctional acrylate or methacrylate monomers have more than one acrylate or methacrylate ester group bonded to a $C_2$–$C_{24}$ difunctional or polyfunctional alkylene, cycloalkylene, or aromatic residue. Species within the class of multifunctional acrylate or methacrylate monomers preferably include ethylene glycol diacrylate, trimethylolpropane triacrylate, ethylene glycol dimethacrylate, trimethylolpropane trimethacrylate, hydroquinone diacrylate and the like.

Acrylonitrile, acrylamide, and vinyl chloride are readily available ethylenically unsaturated monomers.

Acetoacetoxy functional monomers are alkylene esters of acetoacetic acid, wherein the alkylene residue, in addition to an oxygen for forming the acetoacetic acid ester group, also has an acrylate or methacrylate ester bonded the alkylene residue. Such compounds provide a polymer with pendant acetoacetoxy groups, which may optionally be treated with ammonia or a primary or secondary amine to provide an enamine group, as taught in EP 492 847, published Jul. 7, 1992. Acetoacetoxyethyl methacrylate and acetoacetoxymethyl methacrylate are preferred species within the class of acetoacetoxy functional monomers.

A preferred subset of species from all the classes of ethylenically unsaturated monomers include acrylic acid, methyl acrylate, ethyl acrylate, isopropyl acrylate, butyl acrylate, ethylhexyl acrylate, methacrylic acid, methylmethacrylate, ethylmethacrylate, isopropyl methacrylate, butyl methacrylate, ethylhexyl methacrylate, hydroxyethyl acrylate, hydroxyethyl methacrylate, acetoacetoxyethyl acrylate, acetoacetoxyethyl methacrylate, styrene, α-methyl styrene, 4-acetoxystyrene, 4-hydroxystyrene, vinyl napthalene, maleic acid, a maleic acid ester, fumaric acid, a fumaric acid ester, vinyl acetate, vinyl propionate, ethylene glycol diacrylate, trimethylolpropane triacrylate, ethylene glycol dimethacrylate, trimethylolpropane trimethacrylate, maleic anhydride, acrylonitrile, or acrylamide; or a mixture thereof.

The most preferred ethylenically unsaturated monomers are styrene, acrylic acid, butyl acrylate, ethylhexyl acrylate, methacrylic acid, methyl methacrylate, butyl methacrylate, hydroxyethyl methacrylate, and acetoacetoxyethyl methacrylate.

The Branched Sulfopolymer Emulsion Stabilizers

The branched water-dispersible sulfopolymers utilized as emulsion stabilizers in the emulsion polymerization processes of the instant invention are defined for the purpose of this invention as any water dispersible polymer having a branched polymer chain and at least one sulfonate group.

The sulfopolymers of the current invention are sufficiently water-dispersible if a mixture of 0.1 weight percent of the sulfopolymer in substantially pure water may be prepared that does not (after its preparation) precipitate appreciable amounts of the solid sulfopolymer within one hour at 20–100° C. Unbranched sulfopolymers are generally believed to be water-dispersible because the sulfonate groups electrostatically-stabilize colloids when the sulfopolymers are mixed with water. While not wishing to be bound by theory, aqueous dispersions of the branched sulfopolymer emulsion stabilizers of the current invention are believed to be similar to those of other sulfopolymers in this respect.

The branched water-dispersible sulfopolymers useful in the invention are preferably prepared prior to their utilization in an emulsion polymerization process, and can be prepared via a variety of processes. For example, suitable branched sulfopolymers may be prepared by sulfonation of aromatic groups contained within a pre-existing branched polymer. Examples of polymer classes which often contain aromatic groups suitable for sulfonation include but are not limited to polyesters, polyamides, polyesteramides, polycarbonates, polyurethanes, polysulfones, polyethers, and the like.

Preferably, the branched water-dispersible sulfopolymer comprises a polymer having at least one sulfonate group, and is (1) a sulfopolyester, (2) a sulfopolyamide, (3) a sulfopolyesteramide, or (4) a blend thereof.

General methods for the preparation of water-dispersible sulfopolymers such as sulfopolyesters, sulfopolyamides, or sulfopolyesteramides, by co-polymerization of monomeric moieties comprising sulfomonomer moieties, have been described, for example, in U.S. Pat. Nos. 3,734,874, 3,779, 993, 4,335,220, and WO 97/28199. Similar methods for the preparation of branched sulfopolyesters and polyamides from sulfo-monomer moieties and branching agents have been described in U.S. Pat. Nos. 5,543,488, and 5,780,151. Branched water-dispersible sulfopolymers suitable for use in the present invention can preferably be prepared by the methods disclosed in the U.S. patents described above, which are hereby incorporated in their entirety by this reference.

In particular, branched water-dispersible sulfopolymers suitable for use in the present invention are preferably derived from condensing monomeric moieties comprising:

(a) at least one difunctional dicarboxylic acid or ester thereof, or a mixture of the dicarboxylic acids and/or esters, wherein the dicarboxylic acids and/or esters are not sulfomonomers;

(b) at least one sulfomonomer having at least two polymerizable functional groups, wherein the functional groups are hydroxyl, carboxyl, or amino, or polymerizable derivatives of hydroxyl, carboxyl, or amino, or mixtures thereof, wherein each sulfomonomer has at least one sulfonate group bonded to the sulfomonomer;

(c) at least one of (1) a diol, (2) a diamine, (3) a difunctional aminoalcohol, or (4) a mixture thereof; and (d) at least one multifunctional branching agent containing at least three functional groups of hydroxyl, carboxyl, amino, or a copolymerizable derivative of hydroxyl, carboxyl, or amino functional groups, or a mixture thereof;

wherein the sulfopolymer contains substantially equal molar quantities of (a) total carboxyl or ester residues and (b) total alcohol and amine residues.

As is well known, typical polyesters have ester repeat units which are typically derived by condensation of alternating carboxylic acid and alcohol monomeric moieties. The carboxylic acid monomeric moiety is often a dicarboxylic acid or ester having carboxylic acid or ester functional groups, which are condensed to form the ester groups of the polyester. The polyester containing ester groups have carboxyl residues (which are also ester residues) derived from the carboxylic acid monomeric moeities. Similarly, the alcohol monomeric moiety used to form the polyester is often a diol having hydroxyl functional groups, which are condensed to the form the ester groups in the polyester. The ester groups of the polyester, therefore also contain an alcohol residue derived from the alcohol monomeric moeities. As a result, polyesters typically contain substantially equal molar quantities of total carboxyl or ester residues, and total alcohol residues. In alternative terminology, the polyester can be said to simultaneously contain 100 mole percent of total carboxyl or ester residues, and 100 mole percent of total alcohol residues.

If a polyester is modified by the inclusion of other types monomeric moieties having carboxylic acid or ester functional groups, the sum of the moles of the carboxylic acid or ester groups of the monomeric moieties incorporated into the final polymer are added, and their sum is defined to equal 100 mole percent of carboxyl residues. Correspondingly, if the polyester is modified by other types of monomeric moieties having hydroxyl functional groups, the sum of the moles of the hydroxyl groups of the alcohol moieties incorporated into the final polymer are typically added, and defined to equal 100 mole percent of alcohol residues. Therefore, the modified polyester contains substantially equal molar quantities of (a) total carboxyl, or ester residues and (b) total alcohol residues; and simultaneously contains 100 mole percent of carboxyl or ester residues, and 100 mole percent of alcohol residues.

Similarly, polyamides are typically prepared by condensing dicarboxylic acids or their derivatives with organic diamines to form amide repeat units. Polyamides therefore contain substantially equal mole quantities of total carboxyl residues and total amine residues. Modified polyamides simultaneously contain 100 mole percent of carboxyl residues and 100 mole percent of amine residues. Analogously, polyesteramides are typically prepared by condensing dicarboxylic acids or their derivatives with organic aminoalcohols, and have both ester and amide repeat units. Polyesteramides therefore contain substantially equal molar quantities of total carboxyl residues and total alcohol and amine residues. Polyesteramides simultaneously contain 100 mole percent of carboxyl residues and 100 mole percent of total amine and alcohol residues.

The branched water-dispersible sulfopolymers utilized in the present invention are preferably polyesters, polyamides, or polyesteramides which have been modified by the inclusion of (a) at least one sulfomonomer, and (b) at least one multi-functional branching agent, either of which may contain hydroxyl, carboxyl, or amino functional groups. Similar to the situations described above, the resulting branched water-dispersible sulfopolyester, sulfopolyamide, or sulfopolyesteramide contains substantially equal molar quantities of (a) total carboxyl, or ester residues and (b) total alcohol and amine residues. The branched water-dispersible sulfopolyester, sulfopolyamide, or sulfopolyesteramide simultaneously contains 100 mole percent of carboxyl residues and 100 mole percent of alcohol and amine residues.

The difunctional dicarboxylic acid or ester moieties used to prepare the sulfopolymers of the invention are typically an aliphatic dicarboxylic acid or ester, an alicyclic dicarboxylic acid or ester, an aromatic dicarboxylic acid or ester, or mixtures of two or more of the acids and/or esters. Preferred difunctional dicarboxylic acids include succinic acid, glutaric acid, adipic acid, azelaic acid, sebacic acid, fumaric acid, maleic acid, itaconic acid, 1,4-cyclohexanedicarboxylic acid, 1,3-cyclohexanedicarboxylic acid, 1,2-cyclohexanedicarboxylic acid, phthalic acid, isophthalic acid, and terephthalic acid. Lower alkyl esters, anhydrides, or acid halide derivatives of the above difunctional dicarboxylic acid species are also suitable monomeric moieties for forming the sulfopolymers of the invention. These difunctional dicarboxylic acid monomeric moieties are not sulfomonomers, because they do not contain sulfonate groups. An even more preferred alicyclic dicarboxylic acid is 1,4-cyclohexanedicarboxylic acid.

The sulfomonomer moieties used to prepare the sulfopolymers must have at least one sulfonate group, $[-SO_3^-]$ wherein the sulfonate group is part of a structure $R_b-SO3-R_c$. The $R_b$ group is the organic portion of the sulfomonomer, and typically comprises a $C_2$–$C_{24}$ group. The sulfonate group is typically an anionic $-SO_3^-$ group which functions to electrostatically stabilize, disperse, and/or solublize the sulfopolymer in aqueous solutions. The $R_c$ group is typically a cation X (as discussed below), but can also be an organic group which is subsequently saponified, such as a methyl group, so that after saponification the sulfopolymer has anionic $R_b-SO_3^-$ groups.

The sulfomonomers must have at least two polymerizable functional groups bonded to the $R_b$ organic portion of the sulfomonomer. The functional groups condense with other monomer moieties to bond the sulfomonomer into the sulfopolymer chains. The functional groups may be independently selected from hydroxyl (—OH), carboxyl (—$CO_2$—), or amino (—NH—) groups. Therefore, the sulfomonomers can be alcohols, carboxylic acids, or amines.

Sulfomonomers can also have more than two polymerizable functional groups, in which case the sulfomonomer is also a multi-functional branching agent, as discussed below. The sulfonate groups of such sulfomonomers are not considered functional groups for the purpose of condensing the sulfopolymer. An example of such a trifunctional branching agent that is also a sulfomonomer is the trisodium salt of 1,1,1-tris(p-hydroxyphenyl)ethane-3',3",3'''-trisulfonic acid.

Each of the carboxyl, hydroxyl, or amino functional groups of the sulfomonomer can also be present in the form of a copolymerizable derivative of the carboxyl, hydroxyl, or amino functional group. For example, an alcohol sulfomonomer may also be present in the form of an carboxylic acid ester derivative of the alcohol, which is polymerized to form the same sulfopolymer as the original alcohol. Similarly, carboxylic acid sulfomonomers can be present in the form of alkyl or aromatic esters of the original carboxylic acid.

In certain preferred embodiments, the $R_b$ organic portion of the sulfomonomer is an aromatic nucleus comprising benzene, napthalene, anthracene, diphenyl, oxydiphenyl, sulfonyldiphenyl, or methylenediphenyl.

In other preferred embodiments, the sulfomonomer is:
a) a dicarboxylic acid or ester thereof,;
b) a diol; or
c) a hydroxycarboxylic acid.

In many embodiments, the sulfonate group has an $R_c$ group which is a cation X, thereby forming an ionic $-SO_3X$ group. The cation X electrostatically balances the negative charge of the sulfonate group. Examples of suitable X cations include but are not limited to ionic metal cations such as $Li^+$, $Na^+$, $K^+$, $Cs^+$, $Mg^{2+}$, $Ca^{2+}$, $Cu^{2+}$, $Zn^{2+}$, $Ni^{2+}$, $Fe^{2+}$, $Fe^{3+}$. As is well known in the art, non-metallic cations can also be formed from substituted nitrogen, phosphorus, arsenic, carbon, or sulfur compounds. Ammonium cations, such as $NH_4^+$, $NR_4^+$, $NHR_3^+$, or other nitrogen-based cations may be derived from a nitrogen-containing base compound comprising at least one aliphatic, cycloaliphatic, or aromatic substituent, or a mixture thereof. Ammonium cations are preferred non-metallic cations for sulfonate groups.

U.S. Pat. No. 3,779,993 discloses a wide variety of species of sulfomonomers which are suitable for preparation of the branched water-dispersible sulfopolyesters used in the present invention. Preferred sulfomonomers include the alkali metal salts of sulfophthalic acid, sulfoterephthalic acid, sulfoisophthalic acid, 4-sulfo-napthalene-2,7-dicarboxylic acid, and the esters thereof. In the most highly preferred embodiments, the sulfomonomer moieties are 5-sodiosulfoisophthalic acid, or esters thereof, having the structures shown below:

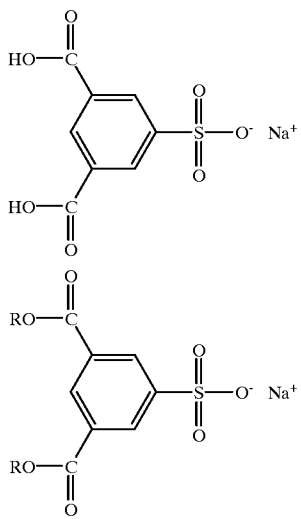

Once formed, the corresponding sulfopolymers have the structure:

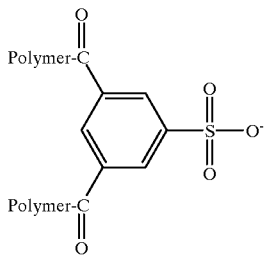

WO 97/28199 describes non-branched sulfopolyesters wherein the sodium sulfonate groups constituted between 7–8 wt % of the sulfopolyester stabilizer, which produce low coagulum levels in emulsion polymerizations. In contrast, in the current invention it has been unexpectedly and surprisingly discovered that very low coagulum levels can be achieved at significantly lower concentrations of sulfonate groups if the sulfopolymer is branched.

In one embodiment, when the branched sulfpolymers of the instant invention are utilized, and the cation comprises sodium, low coagulum levels can be achieved when the weight percent of the —$SO_3Na$ is from about 2 to about 6 wt % of the sulfopolymer. Furthermore, in another embodiment when the cation X is $Li^+$, $K^+$, or $Cs^+$, the sulfopolyester can preferably contain a mole percentage of $SO_3X$ groups equal to the mole percent of —$SO_3^-$ groups contained in an equivalent sulfopolyester having from about 2 to about 6 weight percent of —$SO_3Na$ groups.

In order to provide the preferred low levels of sulfonate content for the sulfopolymers, the difunctional sulfomonomer is preferably present from about 2 to about 20 mole % of the monomeric moieties comprising the sulfopolymer. More preferably, the difunctional sulfomonomer comprises from about 6 to about 10 mole % of the monomeric moieites comprising the water-dispersible sulfopolymer.

Diol/diamine/aminoacid moieties are the third category of monomeric moieties which are condensed to provide the branched sulfopolymers of the invention. These monomeric moieties include (1) a diol, (2) a diamine, (3) a difunctional aminoalcohol, or (4) a mixture thereof. Selection of a diol produces a polyester, selection of a diamine produces a polyamide, and selection of an aminoalcohol produces a polyesteramide.

A large variety of diol, diamine, and aminoalcohol monomers suitable for producing polyesters, polyamides, and polesteramides are known in the art. Suitable classes of diols preferably include $C_2$–$C_{20}$ alkylene glycols, polyethyleneglycols, polypropylene glycols, polybutylene glycols, and aromatic diols. Preferred species of diols include ethylene glycol, 1,3-propanediol, 1,4-butanediol, 1,5-pentanediol, 1,6-hexanediol, 2,2-dimethyl-1,3-propanediol, 1,4-cyclohexanedimethanol, 1,3-cyclohexanedimethanol, 2,2,4,4-tetramethylcyclobutanediol, 1,3-propylene glycol, diethylene glycol, triethylene glycol, or bisphenol A. Lower alkyl ester derivatives of the above-described diols are also suitable for polymerization, and preferably include compounds such as ethyleneglycol diacetate.

Suitable diamine moieties preferably include but are not limited to ethylene diamine and 1,6-diaminohexane. Species of suitable aminoalcohols preferably include 2-aminoethanol, 5-amino-1-pentanol, and 6-amino-1-hexanol.

The sulfopolymers utilized in the invention have a branched structure by virtue of the inclusion of multi-functional branching agent moieties during the condensation of the sulfopolymer. Multi-functional branching agent moieties have at least three functional groups, comprising hydroxyl, carboxyl, amino, or copolymerizable derivatives of hydroxyl, carboxyl, or amino functional groups. The three or more functional groups are bonded to a common organic residue of the multifunctional branching agent. The chemical or geometrical structure of the organic residue is not particularly critical, and comprises any $C_2$–$C_{25}$ substituted or unsubstituted alkylene, alkyl, aryl, or heterocyclic organic residue, which spaces the functional groups so that they are chemically accessible for polymerization. Multi-functional branching agents having four or more functional groups are also suitable.

In certain preferred embodiments, the multi-functional branching agent is:
(a) an aliphatic polyol;
(b) an aromatic polyol;
(c) an aliphatic polyamine;
(d) an aromatic polyamine;
(e) an aliphatic polycarboxylic acid, or the ester, or anhydride thereof;
(f) an ethanolamine; or
(g) ethylenediaminetetraacetic acid, or a salt or lower alkyl ester thereof.

Preferred aliphatic polyol multi-functional branching agent moieties include trimethylolpropane, trimethylolethane, glycerine, pentaerythritol, erythritol, threitol, dipentaerythritol, or sorbitol. Trimethylolpropane is the most preferred aliphatic multi-functional branching agent, primarily because of low cost and ready availability.

Preferred aromatic polyol multi-functional branching agent moieties include phloroglucinol, tris(hydroxyphenyl) ethane, or tris(hydroxyphenyl)methane, or lower alkyl or aryl esters thereof. Additional preferred multi-functional branching agent moieties preferably include trimellitic acid, trimellitic anhydride, pyromellitic dianhydride, 1,3,5-triamino cylohexane, 3,3',4,4'-tetraminobiphenyl, triethanolamine, or dimethylolpropionic acid.

The quantity of the multifunctional branching agent moieties preferably ranges from about 0.1 to about 40 mole %, more preferably, from about 1 to about 20 mole %, and and even more preferably from about 2 to about 6 mole % of the monomeric moieties condensed to form the water-dispersible sulfopolymer. Alternative preferred lower concentration limits for the multifunctional branching agent include 0.5, 1.5, 2.5, 3, and 4 mole %.

The branched sulfo-polymers of the instant invention have been discovered to be unexpectedly superior stabilizers for vinyl and acrylic latex emulsion preparation, as compared with previously known unbranched sulfopolymers. The polymer blends produced by the process of the instant invention are also believed to have unique morphology, physical properties, and/or ranges of molecular weight, as a result of the inclusion of the branched sulfopolymers, and as a result of the improved emulsion polymerization process obtained in the presence of the branched sulfopolymers. Regardless of theory, the practical result of the use of branched sulfopolymers for the processes of the instant invention is the formation of latexes having relatively small particle sizes, high aqueous stability, and low coagulum levels at relatively low levels of sulfopolymer. No such benefits have been taught or suggested by the prior art.

Other composition variables also effect the performance of the branched sulfopolymers as emulsion stabilizers. For instance, colloid particle sizes vary with polymer composition. Branched water-dispersible sulfpolymer compositions which are suitable for use as emulsion stabilizers in the present invention include but are not limited to sulfopolymers obtained by condensing the following exemplary combinations of monomeric moieties:

(1) 44 mole % dimethylterephthalate, 44 mole % dimethylisophthalate, 12 mole % monolithio-2-sulfo-terephthalic acid, and 52 mole % ethylene glycol, 45 mole % 2,2-dimethyl-1,3-propanediol, and 3 mole % trimethylolethane;

(2) 45 mole % terephthalic acid, 45 mole % succinic acid, 10 mole % monopotassium-4-sulfo-phthalic acid, 94 mole % diethylene glycol, and 6 mole % 1,1,1,-tris (hydroxyphenyl)ethane;

(3) 40 mole % 1,4-cyclohexanedicarboxylic acid, 45 mole % 2,6-napthalenedicarboxylic acid, 15 mole % monocesium-5-sulfo-isophthalic acid, 94 mole % 1,3-propanediol, and 6 mole % glycerine;

(4) 46 mole % phthalic anhydride, 46 mole % isophthalic acid, 8 mole % sodium-5-sulfo-isophthalic acid, 95 mole % triethylene glycol, and 5 mole % pentaerythritol;

(5) 40 mole % phthalic acid, 46 mole % 1,3-cyclohexanedicarboxylic acid, 9 mole %, dimethyl-5-sodiosulfo-isophthalate, 5 mole % trimellitic anhydride, and 100 mole % ethylenediamine;

(6) 80 mole % isophthalic acid, 20 mole % monosodium-5-sulfo-dimethylisophthalate, 5 mole % trimethylolethane, 80 mole % 1,4-cylohexanedimethanol, and 15 mole % 1,3-propanediol;

(7) 92 mole % 1,4-cyclohexanedicarboxylic acid, 8 mole % 5-sodiosulfoisophthalic acid, 65 mole % diethylene glycol, 30 mole % 1,4-cyclohexanedimethanol, and 5 mole % trimethylolpropane (8) 90 mole % isophthalic acid, 10 mole %, 5-sodiosulfo-isophthalatic acid, 95 mole % diethylene glycol, and 5 mole % triethanolamine.

In certain preferred embodiments, the branched water-dispersible sulfopolymer is a sulfopolyester, derived from the copolymerization of monomeric moieties comprising an aliphatic or alicyclic dicarboxylic acid or ester thereof; an aromatic dicarboxylic acid sulfomonomer or an ester thereof; a polyalkylene glycol; an aliphatic diol; and a multifunctional polyol.

In other preferred embodiments, the sulfopolymer is derived from condensing sulfomonomer moieties comprising 5-sodiosulfoisophthalic acid or an ester thereof, and a multifunctional branching agent moiety comprising trimethylolpropane.

In another embodiment, the sulfopolymer may contain an additional difunctional monomer reactant moiety comprising hydroxycarboxylic acids, aminocarboxylic acids, or mixtures thereof. 4-hydroxy-benzoic acid and p-aminobenzoic acid are examples of these classes of difunctional monomer reactant moieties which have two different functional groups.

In one highly preferred embodiment the branched water-dispersible sulfopolymer utilized in the invention is a sulfopolyester derived from condensing monomeric moieties comprising:

(a) at least one difunctional dicarboxylic acid or ester thereof, or a mixture of the dicarboxylic acids and/or esters, wherein the dicarboxylic acids and/or esters are not sulfomonomers;

(b) at least one sulfomonomer having at least two polymerizable functional groups, wherein the functional groups are hydroxyl, carboxyl, or amino, or polymerizable derivatives of hydroxyl, carboxyl, or amino, or mixtures thereof; wherein each sulfomonomer has at least one sulfonate group bonded to the sulfomonomer;

(c) at least one diol; and (d) at least one multifunctional branching agent containing at least three functional groups of hydroxyl, carboxyl, amino, or a copolymerizable derivative of hydroxyl, carboxyl, or amino functional groups, or a mixture thereof; and wherein the sulfopolyester contains substantially equal molar quantities of (a) total carboxyl, or ester residues and (b) total alcohol residues.

In another highly preferred embodiment, the branched water-dispersible sulfopolymer comprises a sulfopolyester derived from the copolymerization of monomeric moieties comprising from about 80 to about 95 mole % 1,4-cyclohexanedicarboxylic acid or a lower alkyl ester thereof; from about 5 to about 20 mole % 5-sodiosulfoisophthalic acid or a lower alkyl ester thereof; from about 40 to about 80 mole % diethylene glycol; from about 20 to about 40 mole % 1,4-cyclohexanedimethanol; and from about 0.1 to about 20 mole % trimethylol propane.

Additionally, the intrinsic viscosities of the sulfopolymers may effect the efficacy of the sulfopolymers as emulsion stabilizers. Generally, the branched water-dispersible sulfopolymers have an intrinsic viscosity from about 0.1 to about 0.8 dL/g as measured in a 60/40 phenol tetrachloroethane solvent at 25° C. Preferably, the sulfopolymer intrinsic viscosity varies from about 0.2 to about 0.7. More preferably, the sulfopolymer intrinsic viscosity varies from about 0.3 to about 0.65.

The Emulsion Polymerization Process

The polymerization process of the invention provides a water-dispersed polymer blend, i.e. a latex, by polymerizing a mixture of water, a branched water-dispersible sulfopolymer, and ethylenically unsaturated monomers.

Typically, the branched water-dispersible sulfopolymer comprises from about 0.5 to about 65 weight % of the weight of the polymer blend, and the polymerized ethylenically unsaturated monomers correspondingly comprise from about 95.5 to about 35 weight % of the weight of the polymer blend, based on the combined dry weight of these two types of polymers. Preferably, the branched water-dispersible sulfopolymer comprises from about 1.0 to about 30 weight % of the weight of the polymer blend, and the polymerized ethylenically unsaturated monomer comprises from about 99 to about 70 weight % of the weight of the polymer blend. More preferably, the branched water-dispersible sulfopolymer comprises from about 1.5 to about 8 weight % of the weight of the polymer blend; and the polymerized ethylenically unsaturated monomer comprises from about 98.5 to about 92 weight % of the weight of the polymer blend.

In many embodiments, the mixing step of the polymerization process additionally comprises mixing a polymerization initiator, which starts the free-radical polymerization of the ethylenically unsaturated monomers. Any number of polymerization initiators (both thermal and redox systems), reducing agents, catalysts, or a mixture thereof can be used to initiate formation of small particle size latexes.

Typical polymerization initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and preferably include sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above described reducing agents, promote decomposition of the polymerization initiator under the reaction conditions. Suitable catalysts preferably include transition metal compounds such as ferrous sulfate heptahydrate, ferrous chloride, cupric sulfate, cupric chloride, cobalt acetate, cobaltous sulfate, and mixtures thereof.

However, due to the negative effect of added electrolyte on the stability of the water-dispersible polyesters used in this invention, it is necessary to minimize the electrolyte content of the latex recipe to minimize coagulum. For this reason, the preferred initiator, as part of a redox pair, is t-butyl hydroperoxide (TBHP). The preferred reductants for redox system used in this invention are sodium formaldehyde sulfoxylate (SFs), isoascorbic acid (IAsA) and ascorbic acid (AsA) with the most preferred reductant being isoascorbic acid.

Finally, though it is not necessary, chain transfer agents such as mercaptans may be used to control the molecular weights of the seed and/or any or all of the subsequent polymerization stages. Exemplary chain transfer agents are butyl mercaptan, mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid. The reactive chain transfer agents taught in U.S. Pat. No. 5,247,040 (incorporated herein by this reference in its entirety), may also be used, including allyl mercaptopropionate, allyl mercaptoacetate, crotyl mercaptopropionate, and crotyl mercaptoacetate.

In many preferred embodiments of emulsion polymerization process, the branched water-dispersible sulfopolymer is first mixed with water to form an aqueous sulfopolymer dispersion containing from about 0.1 to about 35% by weight solids; then the ethylenically unsaturated monomer and preferably a polymerization initiator are mixed with the sulfopolymer dispersion. The initial dispersion of the sulfopolymer in the water is often achieved by mild heating at temperatures from about 40° C. to about 90° C., and vigorous mixing, over a period of time ranging from about 0.5 hours to about 4 hours. The aqueous dispersion of the sulfopolymer should preferably not contain particles of greater than 150 nm.

In many embodiments, the aqueous sulfopolymer dispersion is added to a reaction vessel, then the ethylenically unsaturated monomers and the polymerization initiator are incrementally added over a period of time concurrent with polymerization for a polymerization time period sufficient to substantially complete polymerization of the ethylenically unsaturated monomers. The reaction vessel and aqueous sulfopolymer dispersion are typcially vigorously mixed, and maintained at temperatures between about 25° C. to about 85° C. during the polymerization process, or preferably temperatures from between about 60° C. to about 80° C. The polymerization time period can be from about 1 hour to about six hours. More preferably, the polymerization time period is from about 2 hours to about 4 hours.

Certain embodiments of the process for preparing these polymers involves charging the water-dispersible polyester or polyester-amide to the reaction vessel, and feeding in the monomers for the first stage of the latex under monomer starved conditions. As used herein, the term "starved-feed" or "monomer starved" refers to a process where a mixture of the monomers and separately the initiator are fed into the vigorously mixed reaction mixture over a period of time. The addition rate and process temperature is optimized for the initiator used. After the first stage monomers are fed into the reactor, a mixture of monomers, comprised of, for example, styrene, butyl acrylate, and the monomers of which define the second stage are fed into the reactor. This process results in better compositional control of the copolymers since a high conversion of monomer to polymer is maintained in the reaction vessel. This process also results in better temperature control of the polymerization.

The final water dispersed polymer blend produced by the emulsion polymerization process is produced in the form of a latex. Preferably, the water dispersed polymer blend is a polyester/acrylic latex having an average particle diameter of less than 150 nm. Even more preferably, the average particle diameter is less than about 100 nm.

Preferably, the water dispersed polymer blends produced by the process have less than about 1 weight % coagulum. The percentage of coagulum produced is calculated based the dry weight of any solids precipitated in the reactor, and/or removed from the emulsion by filtration through a suitable screen or filter (typically 100 micron), as a percentage of the total weight of the sulfopolymer and ethylenically unsaturated monomers fed to the polymerization. More preferably, less than about 0.5 weight % coagulum is produced by the process of the invention. Even more preferably, less than about 0.2 weight % coagulum is produced.

In a highly preferred embodiment, the invention provides a process for preparing water dispersed polymer blends, comprising:
(a) dispersing a branched water dispersible sulfopolyester in water, to form an aqueous sulfopolyester dispersion containing from about 0.1% to about 35% sulfopolyester solids by weight; and
(b) incrementally adding at least one ethylenically unsaturated monomer, during a polymerization time period sufficient to substantially complete polymerization of the ethylenically unsaturated monomers; wherein
  (i) the ethylenically unsaturated monomers comprise an acrylic or methacrylic monomer, styrene, vinyl acetate, or a mixture thereof;
  (ii) the branched water dispersible sulfopolymer comprises about 1.5 to 8 weight % of the dry weight of the polymer blend, and the polymerized ethylenically unsaturated monomers comprise about 98.5 to 92 weight % of the dry weight of the polymer blend; and
  (iii) the water dispersed polymer blend contains less than about 0.5 weight % coagulum; based on the combined dry weights of the polymers.

In a highly preferred embodiment, the branched water-dispersible sulfopolyester utilized in the above method is derived from the copolymerization of monomeric moieties comprising:
(a) from about 80 to about 95 mole % 1,4-cyclohexanedicarboxylic acid or a lower alkyl ester thereof, from about 5 to about 20 mole % 5-sodiosulfoisophthalic acid or a lower alkyl ester thereof, wherein the total mole % of cyclohexanedicarboxylic acid, and 5-sodiosulfoisophthalic acid, or their lower alkyl esters, is 100 mole %;
(b) from about 40 to about 80 mole % diethylene glycol, from about 20 to about 40 mole % 1,4-cyclohexanedimethanol, and from about 0.1 to about 20 mole % trimethylol propane; wherein the total mole % of diethylene glycol, 1,4-cyclohexanedimethanol, and trimethylol propane is 100 mole %.

The Polymer Blends, and the Coatings Prepared from Them

In additional embodiments, the emulsion polymerization processes of the invention provides novel and superior water-dispersed polymer blends, as prepared by the processes of the invention. The polymer blends are believed to have unique latex stability, ranges of molecular weight and particle size, polymer morphology, and/or superior coating properties as a result of the presence of the branched sulfopolymers, and the superior emulsion polymerization process obtained in the presence of the branched sulfopolymers.

Furthermore, in other embodiments the invention provides a composition suitable for preparing a water resistant coating comprising:
(a) a water-dispersed polymer blend prepared by the processes of the invention; and
(b) one or more additives, further comprising a leveling agent, a rheology agent, a flow control agent, a plasticizer, a flatting agent, a pigment wetting and dispersing agent, a surfactant, an ultraviolet light absorber, an ultraviolet light stabilizer, a tinting pigment, an extender, a defoaming agent, an antifoaming agent, an anti-settling agent, an anti-sag agent, a bodying agent, an anti-skinning agent, an anti-flooding agent, an anti-foaming agent, a fungicide, a mildewcide, a corrosion inhibitor, a thickening agent, a water-miscible organic solvent, or a coalescing agent.

Specific examples of such additives for coatings applications can be found in *Raw Materials Index,* published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include synthetic silica, available from the Davison Chemical Division of W. R. Grace & Company under the trademark SYLOID™ polypropylene, available from Hercules Inc., under the trademark HERCOFLAT™; synthetic silicate, available from J. M. Huber Corporation under the trademark ZEOLEX™.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the trademark ANTI TERRA™. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners include the methylene/ethylene oxide associative thickeners and water soluble carboxylated thickeners, for example, those sold under the UCAR POLYPHOBE™ trademark by UnionCarbide.

Several proprietary antifoaming agents are commercially available, for example, under the trademark BRUBREAK of Buckman Laboratories Inc., under the Byk™ tradename of BYK Chemie, U.S.A., under the Foamaster™ and Nopco™ trademarks of Henkel Corp./Coating Chemicals, under the DREWPLUS™ trademarks of the Drew Industrial Division of Ashland Chemical Company, under the TRYSOL™ and TROYKYD™ trademarks of Troy Chemical Corporation, and under the SAG™ trademarks of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazoles, hindered amines, and hindered benzoates, available from American Cyanamid Company under the trademark CYASORB UV, and diethyl-3-acetyl-4-hydroxybenzyl-phosphonate, 4-dodecyloxy-2-hydroxy benzophenone, and resorcinol monobenzoate.

As a further embodiment of the present invention, there is provided a coating composition optionally containing one or more of the above-described additives. It may also be desirable to utilize a water-miscible organic solvent and/or coalescing agent. Such solvents and coalescing agents are well known and include ethanol, n-propanol, isopropanol, n-butanol, sec-butanol, iso-butanol, ethylene glycol monobutyl ether, propylene glycol n-butyl ether, propylene glycol methyl ether, propylene glycol monopropyl ether, dipropylene glycol methyl ether, diacetone alcohol, TEX-ANOL™ ester alcohol (Eastman Chemical Company), and the like. Such solvents and coalescing aids may also include reactive solvents and coalescing aids such as diallyl phthalate, SANTOLINK XI-100™ polyglycidyl allyl ether from Monsanto, and others as described in U.S. Pat. Nos. 5,349,026 and 5,371,148, incorporated herein by reference.

Pigments suitable for use in the coating compositions envisioned by the present invention are the typical organic and inorganic pigments, well-known to one of ordinary skill in the art of surface coatings, especially those set forth by the *Colour Index,* 3d Ed., 2d Rev., 1982, published by the Society of Dyers and Colourists in association with the American Association of Textile Chemists and Colorists. Examples include, but are not limited to the following: CI Pigment White™6 (titanium dioxide); CI Pigment Red101 (red iron oxide); CI Pigment Yellow42, CI Pigment Blue™15, 15:1, 15:2, 15:3, 15:4 (copper phthalocyanines); CI Pigment Red 49:1; and CI Pigment Red 57:1. Pigments and/or fillers are optionally present in the coatings compositions in a concentration of about 1 to about 70 weight percent, preferably about 30 to about 60 weight percent, based on the total weight of the solids in the composition.

The water-dispersed polymer blends or latex compositions of the present invention may also be used alone or in combination with other waterborne coating compositions in the form of a blend. Accordingly, as a further aspect of the invention, there is provided a waterborne coating composition comprising a blend of the hybrid latexes of the present invention and a water-dispersible polymer selected from the group consisting of alkyds, polyesters, polyester-amides, cellulose esters, polyurethanes, polyethers, acrylics, and vinyl polymers.

Upon formulation as described above, the coating compositions are then applied to the desired substrate or article, e.g., steel, aluminum, wood, gypsum board, or galvanized sheeting (either primed or unprimed), and drying the coating composition after it is applied to the article. Thus, as a further embodiment of the present invention, there is provided an article which has been coated with the coating compositions of the present invention and dried.

Experimental

The following examples are put forth so as to provide those of ordinary skill in the art with a complete disclosure and description of how the compounds, compositions, articles, and/or processes claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Preparations of Aqueous Dispersions of Branched Sulfopolymers

EXAMPLE 1

Branched Sulfopolyester Dispersion—IV-0.21

A 300 mililiter three necked round bottom flask was fitted with a heating mantle, a water cooled condenser, and a Y-tube with a thermocouple, and means for stirring. One hundred-five grams of deionized water was placed in the flask and heated to 65° C. Fourty-five grams of a branched sulfopolyester containing 92 mole % 1,4-cyclohexanedicarboxylic acid, 8 mole % 5-sodiosulfoisophthalic acid, 65 mole % diethylene glycol, 30 mole % 1,4-cyclohexanedimethanol, and 5 mole % trimethylolpropane, having an I.V. of ~0.21 was added to the stirred water through a side neck over time. The aqueous product was heated with stirring over 2 hours to achieve dispersion. The final product was a clear, thin dispersion having 30.11 wt % dispersed solids, a 30 nm particle size, and a pH of 4.74.

EXAMPLE 2

Branched Sulfopolyester Dispersion—IV-0.40

The procedure of Example 1 was followed, except that the branched sulfopolyester utilized (having equivalent chemical composition) had an I.V. of ~0.40. and the dispersion was further heated for an additional hour at 75° C., and then an addition 30 minutes at 85° C. The final product was a viscous, milky dispersion having 29.98% dispersed solids, a particle size of 95 nm, and a pH of 4.47.

EXAMPLE 3

Branched Sulfopolyester Dispersion—IV-0.65

A procedure similar to Example 1 was followed, except the branched sulfopolyester utilized (having equivalent chemical composition) had an I.V. of ~0.65, and was intially added to 150 grams of water at 85° C. for 30 minutes, then 30 grams of additional water was added and heating continued for an additional 150 minutes, then the dispersion was cooled and filtered. A hazy dispersion having 25.08% dispersed solids and a particle size of 86 nm was obtained.

Comparative Example 4

Un-branched Sulfopolyester Dispersion A

An aqueous dispersion was prepared having 30 wt % of an unbranched sulfopolyester which had a sulfopolyester composition of 89 mole % isophthalic acid monomers, 11 mole % 5-sodiosulfoisophthalic acid monomers, and 100 mole % diethylene glycol diol monomers, and an I.V. of ~0.38 was obtained.

Comparative Example 5

Un-branched Sulfopolyester Dispersion B

An aqueous dispersion was prepared having 30 wt % of an unbranched sulfopolyester which had a sulfopolyester composition of 82 mole % isophthalic acid monomers, 18 mole % 5-sodiosulfoisophthalic acid monomers, and 54 mole % diethylene glycol diol monomers, 46 mole % 1,4-cyclohexanedimethanol monomers, and an I.V. of ~0.33

Comparative Example 6

Un-branched Sulfopolyester Dispersion C

An aqueous dispersion was prepared having 30 wt % of an unbranched sulfopolyester which had a sulfopolyester composition of 78 mole % isophthalic acid monomers, 22 mole % 5-sodiosulfoisophthalic acid monomers, and 10 mole % ethylene glycol diol monomers, and 90 mole % 1,4-cyclohexanedimethanol monomers, and an I.V. of ~0.24.

Preparations of Styrene/Methyl Methacrylate Polymer Blend Emulsions

Examples 7–10 illustrate the preparation of styrene/methylmethacrylate water-dispersed polymer blends, emulsion polymerized in presence of the various sulfopolyester emulsion stabilizers dispersions samples described in examples 1–6. The sulfopolyesters constituted 5.26 wt % of the combined weight of the styrene, methylmethacrylate, and sulfopolymer.

EXAMPLE 7
Emulsion Prepared from Branched Sulfopolyester—IV-0.21

A reaction kettle equipped with a stirring impeller and a water bath heater was charged with 376.5 grams of de-ionized water, 43.60 grams of the dispersion from Example 1, and 0.45 grams of a 1% solution of ammonium iron sulfate. Styrene (187.06 grams) and methylmethacrylate (62.35 grams) were mixed and fed into the reactor at a feed rate of 1.66 grams/min over 150 minutes. Simultaneously, an initiator feed of 0.435 grams of ammonium persulfate in 40.0 grams of water, was fed at 0.270 grams/minute over 150 minutes, and 0.264 grams of sodium bisulfite in 40.0 grams of water was fed at 0.268 grams/minute over 150 minutes. After all feeds were added, the emulsion was held for an additional 45 minutes at 52° C. The emulsion was cooled to 25° C., and filtered from any coagulum through a 100 micron wire mesh, with care being taken to collect all coagulum from the kettle and stirring impeller. 0.349 grams of coagulum was collected from the filter after drying, corresponding to 0.14 wt % of the total weight of sulfopolyester, styrene, and methylmethacrylate. The filtered emulsion was a milky thin dispersion having 33.34% solids with a particle size of 71 nm and a pH of 2.29. The results are shown in entry 1a of Table 1.

EXAMPLE 8
Emulsion Prepared from Branched Sulfopolyester—IV-0.40

The same procedure and quantities of Example 7 was followed, except that branched sulfopolyester of I.V. ~0.40 was utilized, as obtained from the 43.60 grams of the dispersion prepared in Example 2. 0.070 grams of coagulum (0.03 wt %) was collected on filtration and drying. The filtered emulsion was thin and milky, contained 34.09 wt % solids with a particle size of 82 nm, and had a pH of 2.27. The results are shown in entry 2a of Table 1.

EXAMPLE 9
Emulsion Prepared from Branched Sulfopolyester—IV-0.65

The same procedure and quantities of Example 7 was followed, except that the branched sulfopolyester of I.V. ~0.65 was utilized, as obtained from the 52.32 grams of the dispersion prepared in Example 3. Then 0.095 grams of coagulum (0.036 wt %) was collected on filtration and drying. The filtered emulsion was milky, contained 34.09 wt % solids with a particle size of 87 nm. The results are shown in entry 3a of Table 1

Comparative Example 10
Emulsion Prepared from Un-Branched Sulfopolyester A

The same procedure and quantities of Example 7 was followed, except that the unbranched sulfopolyester A from Comparative Example 4 was utilized. Then 1.931 grams of coagulum (0.74 wt %) was collected on filtration and drying. The filtered emulsion was thin and milky, and contained 34.19 wt % solids with a particle size of 71 nm. The results are shown in entry 4a of Table 1.

Comparative Example 11
Emulsion Prepared from Un-Branched Sulfopolyester B

The same procedure and quantities of Example 7 was followed, except that the unbranched sulfopolyester B from Comparative Example 5 was utilized, and 0.218 grams of ammonium carbonate buffer was added to the aqueous sulfopolymer dispersion. 4.966 grams of coagulum (1.89 wt %) was collected on filtration and drying. The results are shown in entry 5b of Table 1.

Comparative Example 12
Emulsion Prepared from Un-Branched Sulfopolyester C

The same procedure and quantities of Example 7 was followed, except that the unbranched sulfopolyester C from Comparative Example 6 was utilized, and 0.218 grams of ammonium carbonate buffer was added to the aqueous sulfopolymer dispersion. 0.366 grams of coagulum (0.15 wt %) was collected on filtration and drying. The results are shown in entry 6b of Table 1.

Additional experiments using the branched sulfopolyester emulsion stabilizer described in Example 2 were conducted and are shown in Table 2. These examples show that it is possible to get low coagulum levels at branched sulfopolymer stabilizer levels as low as 1.5 wt %, with either t-butylhydroperoxide/sodium bisulfite initiator/reductant system, and the t-butylhydroperoxide/isoascorbic acid/ammonium iron sulfate initiator/reductant system. At the very low 1.5 wt % stabilizer levels, use of a buffer gives slightly increased coagulum, but at the higher 5.26% stabilizer levels, very low coagulum is obtained with or without buffer. Coagulum levels are slightly higher when butyl acrylate replaces methylmethacrylate in the formulations, but it is still less than 1%, even with 1.5% branched sulfopolyester stabilizer.

TABLE 1

Parameters for 75/25 Styrene/Methylmethacrylate Emulsion with 5.26% Sulfopolyester Stabilizer, and an Ammonium Persulfate/Sodium Bisulfite Initiator/Reductant System

| Entry # | Sulfopolymer Source | Polymer I.V. | % Solids | Particle Size (nm) | Grams Coagulum | % Coagulum[a] | Ammonium Carbonate |
|---|---|---|---|---|---|---|---|
| 1a | Example 1 | 0.2 | 33.34 | 71 | .349 | .14 | No |
| b | | 0.2 | 32.53 | 68 | .272 | .11 | No |
| 2a | Example 2 | 0.4 | 34.09 | 82 | .070 | .028 | No |
| b | | 0.4 | 34.03 | 83 | .119 | .048 | No |
| 3a | Example 3 | 0.65 | 34.09 | 87 | .095 | .038 | No |
| b | | 0.65 | 34.19 | 79 | .129 | .052 | No |
| 4a | Comparative Example 4 | ~0.38 | 34.20 | 71 | 1.931 | .77 | No |
| b | | ~0.38 | — | — | Crashed | ~100 | Yes |
| 5a | Comparative Example 5 | ~0.33 | 34.30 | 63 | 1.000 | .40 | No |
| b | | ~0.33 | 34.12 | 75 | 4.966 | 1.99 | Yes |

TABLE 1-continued

Parameters for 75/25 Styrene/Methylmethacrylate Emulsion with 5.26% Sulfopolyester Stabilizer, and an Ammonium Persulfate/Sodium Bisulfite Initiator/Reductant System

| Entry # | Sulfopolymer Source | Polymer I.V. | % Solids | Particle Size (nm) | Grams Coagulum | % Coagulum[a] | Ammonium Carbonate |
|---|---|---|---|---|---|---|---|
| 6a | Comparative | ~0.24 | 34.83 | 75 | .413 | .17 | No |
| b | Example 6 | ~0.24 | 33.99 | 69 | .366 | .15 | Yes |

[a]The coagulum was collected on a 100 micron filter and weighed after drying. The % coagulum is based on the grams of coagulum divided by the total weight of styrene and methylmethacrylate.

TABLE 2

Coagulum Level as a Function of Sulfopolyester Loading, Initiator System, Ethylenically Unsaturated Monomer Composition, and Buffer

| Entry | Initiator System | Buffer | % Sulfo-Polymer | Monomer | Monomer Ratio | Theoretical % Solids | Actual % Solids | Grams Coagulum | % Coagulum |
|---|---|---|---|---|---|---|---|---|---|
| 1 | APS/SBS | None | 5.26 | Sty/MMA | 75/25 | 35 | 34.09 | .070 | .028 |
| 2 | APS/SBS | None | 5.26 | Sty/MMA | 75/25 | 35 | 34.03 | .119 | .048 |
| 3 | APS/SBS | None | 1.5 | Sty/MMA | 75/25 | 33.7 | 31.60 | .369 | .148 |
| 4 | APS/SBS | None | 1.5 | Sty/BA | 75/25 | 33.7 | 30.94 | 1.211 | .49 |
| 5 | APS/SBS | None | 1.5 | Sty/BA | 75/25 | 33.7 | 26.19 | 2.320 | .93 |
| 6 | APS/SBS | None | 5.26 | Sty/BA | 75/25 | 35 | 34.40 | .388 | .16 |
| 7 | TBHP/ISA/AIS | None | 5.26 | Sty/MMA | 75/25 | 35 | 35.37 | .070 | .028 |
| 8 | TBHP/ISA/AIS | None | 1.5 | Sty/MMA | 75/25 | 30 | 29.95 | .0454 | .21 |
| 9 | TBHP/ISA/AIS | None | 1.5 | Sty/MMA | 75/25 | 30 | 29.21 | .289 | .135 |
| 10 | TBHP/ISA/AIS | None | 5.26 | Sty/BA | 75/25 | 34.9 | 30.25 | .247 | .099 |
| 11 | TBHP/ISA/AIS | $Na_2CO_3$ | 5.26 | Sty/MMA | 75/25 | 30.0 | 29.93 | .047 | .02 |
| 12 | TBHP/ISA/AIS | $Na_2CO_3$ | 1.5 | Sty/MMA | 75/25 | 30.0 | 29.54 | 2.186 | .88 |

(a) The sulfopolyester contained 92 mole % 1,4-cyclohexanedicarboxylic acid, 8 mole % 5-sodiosulfoisophthalic acid, 65 mole % diethylene glycol, 30 mole % 1,4-cyclohexanedimethanol, and 5 mole % trimethylolpropane.
(b) APS/SBS is ammonium persulfate/sodium bisulfite; TBHP/ISA/AIS is t-butylhydroperoxide/isoascorbic acid/ammonium ironsulfate.
(c) Monomer Code is sty-styrene; MMA - methylmethacrylate; BA-butylacrylate.
(d) % coagulum is the (grams of dry coagulum/gram of emulsion monomers) × 100
(e) Particle size is effective particle diameter (nm) and was determined on the Brookhaven BI-90 particle size analyzer.
(f) % Sulfopolymer was based on the total resin solids, i.e., polyester and emulsion monomers.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for preparing a water dispersed polymer blend, comprising the steps of:
   (I) mixing
      (a) water;
      (b) at least one ethylenically unsaturated monomer;
      (c) at least one branched water-dispersible sulfopolymer comprising
         i. a polyester,
         ii. a polyamide, or
         iii. a polyesteramide,
         wherein the polyester, polyamide, or polyesteramide is modified by at least one multifunctional branching agent; and
   (II) polymerizing the at least one ethylenically unsaturated monomer within the mixture to provide the water dispersed polymer blend.

2. The process of claim 1, wherein the ethylenically unsaturated monomer comprises:
   (a) an acrylic or methacrylic monomer;
   (b) an alkenyl aromatic compound;
   (c) a vinyl ester;
   (d) an unsaturated dicarboxylic acid or the anhydride or lower alkyl diester thereof;
   (e) a multifunctional acrylate or methacylate monomer;
   (f) acrylonitrile or acrylamide;
   (g) vinyl chloride;
   (h) an acetoacetoxy functional monomer.

3. The process of claim 1, wherein the ethylenically unsaturated monomer comprises acrylic acid, methyl acrylate, ethyl acrylate, isopropyl acrylate, butyl acrylate, ethylhexyl acrylate, methacrylic acid, methylmethacrylate, ethylmethacrylate, isopropyl methacrylate, butyl methacrylate, ethylhexyl methacrylate, hydroxyethyl acrylate, hydroxyethyl methacrylate, acetoacetoxyethyl acrylate, acetoacetoxyethyl methacrylate, styrene, α-methyl styrene, 4-acetoxystyrene, 4-hydroxystyrene, vinyl napthalene, maleic acid, a maleic acid ester, fumaric acid, a fumaric acid ester, vinyl acetate, vinyl propionate, ethylene glycol diacrylate, trimethylolpropane triacrylate, ethylene glycol dimethacrylate, trimethylolpropane trimethacrylate, maleic anhydride, acrylonitrile, or acrylamide or a mixture thereof.

4. The process of claim 1, wherein the ethylenically unsaturated monomer comprises styrene, acrylic acid, butyl acrylate, ethylhexyl acrylate, methacrylic acid, methyl methacrylate, butyl methacrylate, hydroxyethyl methacrylate, or acetoacetoxyethyl methacrylate.

5. The process of claim 1, wherein the branched water-dispersible sulfopolymer comprises a polymer having at least one sulfonate group, and is (1) a sulfopolyester or (2) a sulfopolyamide or (3) a sulfopolyesteramide, or (4) a blend thereof.

6. The process of claim 1 wherein the branched water-dispersible sulfopolymer is derived from condensing monomeric moieties comprising:
   (a) at least one difunctional dicarboxylic acid or ester thereof, or a mixture of the dicarboxylic acids and/or esters, wherein the dicarboxylic acids and/or esters are not sulfomonomers;
   (b) at least one sulfomonomer having at least two polymerizable functional groups, wherein the functional groups are hydroxyl, carboxyl, or amino, or polymerizable derivatives of hydroxyl, carboxyl, or amino, or mixtures thereof; wherein each sulfomonomer has at least one sulfonate group bonded to the sulfomonomer;
   (c) at least one of (1) a diol, (2) a diamine, (3) a difunctional aminoalcohol, or (4) a mixture thereof; and
   (d) at least one multifunctional branching agent containing at least three functional groups of hydroxyl, carboxyl, amino, or a copolymerizable derivative of hydroxyl, carboxyl, or amino functional groups, or a mixture thereof;
wherein the sulfopolymer contains substantially equal molar quantities of (a) total carboxyl or ester residues and (b) total alcohol and amine residues.

7. The process of claim 6, wherein the difunctional dicarboxylic acid or ester comprises an aliphatic dicarboxylic acid or ester, an alicyclic dicarboxylic acid or ester, an aromatic dicarboxylic acid or ester, or mixtures of two or more of the acids and/or esters.

8. The process of claim 6, wherein the difunctional dicarboxylic acid or ester comprises succinic acid, glutaric acid, adipic acid, azelaic acid, sebacic acid, fumaric acid, maleic acid, itaconic acid, 1,4-cyclohexanedicarboxylic acid, 1,3-cyclohexanedicarboxylic acid, 1,2-cyclohexanedicarboxylic acid, phthalic acid, isophthalic acid, or terephthalic acid, or a lower alkyl ester thereof.

9. The process of claim 6, wherein the sulfomonomer contains an aromatic nucleus comprising benzene, napthalene, anthracene, diphenyl, oxydiphenyl, sulfonyldiphenyl, or methylenediphenyl; and wherein the sulfonate group is attached to the aromatic nucleus.

10. The process of claim 6, wherein the sulfomonomer comprises:
   a) a dicarboxylic acid or ester thereof;
   b) a diol; or
   c) a hydroxycarboxylic acid.

11. The process of claim 6, wherein the sulfonate group of the sulfomonomer has a cation X which forms an —$SO_3X$ group.

12. The process of claim 11, wherein the cation X comprises $Li^+$, $Na^+$, $K^+$, $Cs^+$, $Mg^{2+}$, $Ca^{2+}$, $Cu^{2+}$, $Zn^{2+}$, $Ni^{2+}$, $Fe^{2+}$, $Fe^{3+}$, $NH_4^+$, or a nitrogen-based cation derived from a nitrogen-containing base compound comprising at least one aliphatic, cycloaliphatic, or aromatic substituent; or a mixture thereof.

13. The process of claim 11, wherein the cation X comprises $Na^+$ and the weight percent of the —$SO_3$ is from about 2 to about 6%.

14. The process of claim 11, wherein the cation X is $Li^+$, $K^+$, or $Cs^+$, and the sulfopolymer contains a mole percentage of $SO_3X$ groups equal to the mole percent of —$SO_3$ groups contained in an equivalent sulfopolyester having from about 2 to about 6 weight percent of —$SO_3Na$ groups.

15. The process of claim 6, wherein the sulfomonomer comprises 5-sodiosulfoisophthalic acid or an ester thereof.

16. The process of claim 6, wherein the sulfomonomer comprises from about 2 to about 20 mole % of the water-dispersible sulfopolymer.

17. The process of claim 6, wherein the sulfomonomer comprises from about 6 to about 10 mole % of the water-dispersible sulfopolymer.

18. The process of claim 6, wherein the diol comprises ethylene glycol, 1,3-propanediol, 1,4-butanediol, 1,5-pentanediol, 1,6-hexanediol, 2,2-dimethyl-1,3-propanediol, 1,4-cyclohexanedimethanol, 1,3-cyclohexanedimethanol, 2,2,4,4-tetramethylcyclobutanediol, 1,3-propylene glycol, diethylene glycol, triethylene glycol, a polyethylene glycol, a polypropylene glycol, a polybutylene glycol, or bisphenol A; or a lower alkyl ester derivative thereof.

19. The process of claim 6, wherein the multi-functional branching agent comprises:
   (a) an aliphatic polyol;
   (b) an aromatic polyol;
   (c) an aliphatic polyamine;
   (d) an aromatic polyamine;
   (e) an aliphatic polycarboxylic acid, or the ester, or anhydride thereof;
   (f) an ethanolamine; or
   (g) ethylenediaminetetraacetic acid, or a salt or lower alkyl ester thereof.

20. The process of claim 6, wherein the multi-functional branching agent comprises trimethylolpropane, trimethylolethane, glycerine, pentaerythritol, erythritol, threitol, dipentaaerythritol, or sorbitol.

21. The process of claim 6, wherein the multi-functional branching agent comprises phloroglucinol, tris(hydroxyphenyl)ethane, or tris(hydroxyphenyl)methane, or a lower alkyl or aryl ester thereof.

22. The process of claim 6, wherein the multi-functional branching agent comprises trimellitic acid, trimellitic anhydride, pyromellitic dianhydride, or dimethylolpropionic acid.

23. The process of claim 6, wherein the multifunctional branching agent comprises from about 0.1 to about 40 mole % of the monomeric moieties of the water-dispersible sulfopolymer.

24. The process of claim 6, wherein the multifunctional branching agent comprises from about 1 to about 20 mole % of the monomeric moieties of the water-dispersible sulfopolymer.

25. The process of claim 6, wherein the multifunctional branching agent comprises from about 2 to about 6 mole % of the monomeric moieties of the water-dispersible sulfopolymer.

26. The process of claim 6 wherein the sulfomonomer comprises 5-sodiosulfoisophthalic acid or an ester thereof, and the multifunctional branching agent comprises trimethylolpropane.

27. The process of claim 6, wherein the sulfopolymer additionally comprises a difunctional monomer reactant moiety comprising a hydroxycarboxylic acid, aminocarboxylic acid, or a mixture thereof.

28. The process of claim 1 wherein the branched water-dispersible sulfopolymer is a sulfopolyester derived from condensing monomeric moieties comprising:
    (a) at least one difunctional dicarboxylic acid or ester thereof, or a mixture of the dicarboxylic acids and/or esters, wherein the dicarboxylic acids and/or esters are not sulfomonomers;
    (b) at least one sulfomonomer having at least two polymerizable functional groups, wherein the functional groups are hydroxyl, carboxyl, or amino, or polymerizable derivatives of hydroxyl, carboxyl, or amino, or mixtures thereof, wherein each sulfomonomer has at least one sulfonate group bonded to the sulfomonomer;
    (c) at least one diol; and
    (d) at least one multifunctional branching agent containing at least three functional groups of hydroxyl, carboxyl, amino, or a copolymerizable derivative of hydroxyl, carboxyl, or amino functional groups, or a mixture thereof; and
wherein the sulfopolyester contains substantially equal molar quantities of (a) total carboxyl, or ester residues and (b) total alcohol residues.

29. The process of claim 1, wherein the branched water-dispersible sulfopolymer is a sulfopolyester derived from the copolymerization of monomeric moieties comprising: an aliphatic or alicyclic dicarboxylic acid or ester thereof; an aromatic dicarboxylic acid sulfomonomer or an ester thereof; a polyalkylene glycol; an aliphatic diol; and a multifunctional polyol.

30. The process of claim 1, wherein the branched water-dispersible sulfopolymer is a sulfopolyester derived from the copolymerization of monomeric moieties comprising:
    (a) from about 80 to about 95 mole % 1,4-cyclohexanedicarboxylic acid or a lower alkyl ester thereof, and from about 5 to about 20 mole % 5-sodiosulfoisophthalic acid or a lower alkyl ester thereof; and
    (b) from about 40 to about 80 mole % diethylene glycol; from about 20 to about 40 mole % 1,4-cyclohexanedimethanol; and from about 0.1 to about 20 mole % trimethylol propane.

31. The process of claim 1, wherein the branched water-dispersible sulfopolymer has an intrinsic viscosity from about 0.1 to about 0.8 dL/g as measured in a 60/40 phenol tetrachloroethane solvent at 25° C.

32. The process of claim 1, wherein the branched water-dispersible sulfopolymer has an intrinsic viscosity from about 0.2 to about 0.7 dL/g as measured in a 60/40 phenol tetrachloroethane solvent at 25° C.

33. The process of claim 1, wherein the branched water-dispersible sulfopolymer comprises from about 0.5 to about 65 weight % of the weight of the polymer blend; and the polymerized ethylenically unsaturated monomer comprises from about 95.5 to about 35 weight % of the weight of the polymer blend, based on the combined dry weight of the polymers.

34. The process of claim 1, wherein the branched water-dispersible sulfopolymer comprises from about 1.0 to about 30 weight % of the weight of the polymer blend; and the polymerized ethylenically unsaturated monomer comprises from about 99 to about 70 weight % of the weight of the polymer blend, based on the combined dry weights of the polymers.

35. The process of claim 1, wherein the branched water-dispersible sulfopolymer comprises from about 1.5 to about 8 weight % of the weight of the polymer blend; and the polymerized ethylenically unsaturated monomer comprises from about 98.5 to about 92 weight % of the weight of the polymer blend; based on the combined dry weights of the polymers.

36. The process of claim 1, wherein the mixing step additionally comprises mixing a polymerization initiator.

37. The process of claim 1, wherein the branched water-dispersible sulfopolymer is mixed with water to form an aqueous sulfopolymer dispersion containing from about 0.1 to about 35% by weight solids; and then the ethylenically unsaturated monomer and a polymerization initiator are mixed with the sulfopolymer dispersion.

38. The process of claim 37, wherein the aqueous sulfopolymer dispersion is added to a reaction vessel, then the ethylenically unsaturated monomers and the polymerization initiator are added, and polymerization continued for a polymerization time period sufficient to substantially complete polymerization of the ethylenically unsaturated monomers.

39. The process of claim 1, wherein the water dispersed polymer blend is a polyester/acrylic latex having an average particle diameter of less than 100 nm.

40. The process of claim 1, wherein the water dispersed polymer blend has less than about 1 weight % coagulum.

41. The process of claim 1, wherein the water dispersed polymer blend has less than about 0.5 weight % coagulum.

42. The process of claim 1, wherein the water dispersed polymer blend has less than about 0.2 weight % coagulum.

43. A process for preparing a water dispersed polymer blend, comprising:
    (a) dispersing a branched water dispersible sulfopolyester in water, to form an aqueous sulfopolyester dispersion containing from about 0.1% to about 35% sulfopolyester solids by weight; and
    (b) incrementally adding at least one ethylenically unsaturated monomer, during a polymerization time period sufficient to substantially complete polymerization of the ethylenically unsaturated monomers; wherein
        (i) the ethylenically unsaturated monomers comprise an acrylic or methacrylic monomer, styrene, vinyl acetate, or a mixture thereof;
        (ii) the branched water dispersible sulfopolymer comprises about 1.5 to 8 weight % of the dry weight of the polymer blend, and the polymerized ethylenically unsaturated monomers comprise about 98.5 to 92 weight % of the dry weight of the polymer blend; and
        (iii) the water dispersed polymer blend contains less than about 0.5 weight % coagulum; based on the combined dry weights of the polymers.

44. The process of claim 42 wherein the branched water-dispersible sulfopolyester is derived from the copolymerization of monomeric moieties comprising:
    i) from about 80 to about 95 mole % 1,4-cyclohexanedicarboxylic acid or a lower alkyl ester thereof, from about 5 to about 20 mole % 5-sodiosulfoisophthalic acid or a lower alkyl ester thereof, wherein the total mole % of cyclohexanedicarboxylic acid, and 5-sodiosulfoisophthalic acid, or their lower alkyl esters, is 100 mole %;

ii) from about 40 to about 80 mole % diethylene glycol, from about 20 to about 40 mole % 1,4-cyclohexanedimethanol, and from about 0.1 to about 20 mole % trimethylol propane, wherein the total mole % of diethylene glycol, 1,4-cyclohexanedimethanol, and trimethylol propane is 100 mole %.

45. The water-dispersed polymer blend prepared by the process of claim 1.

46. The water-dispersed polymer blend prepared by the process of claim 43.

47. A composition for preparing a water-resistant coating comprising:

(a) a water-dispersed polymer blend prepared by the process of claim 1; and (b) one or more additives comprising a leveling agent, a rheology agent, a flow control agent, a plasticizer, a flatting agent, a pigment wetting and dispersing agent, a surfactant, an ultraviolet light absorber, an ultraviolet light stabilizer, a tinting pigment, an extender, a defoaming agent, an anti-foaming agent, an anti-settling agent, an anti-sag agent, a bodying agent, an anti-skinning agent, an anti-flooding agent, an anti-foaming agent, a fungicide, a mildewcide, a corrosion inhibitor, a thickening agent, a water-miscible organic solvent, or a coalescing agent.

48. A water-resistant coated article, prepared by applying the coating composition of claim 45 to an article, and drying the coating composition.

* * * * *

UNITED STATES PATENT AND TRADEMARK OFFICE
CERTIFICATE OF CORRECTION

PATENT NO. : 6,255,366 B1
DATED : July 3, 2001
INVENTOR(S) : Adams et al.

It is certified that error appears in the above-identified patent and that said Letters Patent is hereby corrected as shown below:

Column 26,
Line 2, change "-SO$_3$" to read -- -SO$_3$Na groups --.

Signed and Sealed this

Twenty-third Day of April, 2002

Attest:

Attesting Officer

JAMES E. ROGAN
Director of the United States Patent and Trademark Office